United States Patent
Stanworth et al.

[11] 3,747,408
[45] July 24, 1973

[54] TEMPERATURE MEASUREMENT

[75] Inventors: Colin Graham Stanworth, Penbryn; John Dixon; David Ian Jones, both of Rotherham, all of England

[73] Assignee: British Steel Corporation, London, England

[22] Filed: Oct. 13, 1971

[21] Appl. No.: 188,839

[30] Foreign Application Priority Data
Oct. 15, 1970  Great Britain.................. 49,097/70

[52] U.S. Cl............ 73/355 EM, 73/355 R, 356/44, 356/45
[51] Int. Cl............................. G01j 5/04, G01j 5/60
[58] Field of Search.................. 73/355 R, 355 EM, 73/351; 356/43–45

[56] References Cited
UNITED STATES PATENTS
| | | | |
|---|---|---|---|
| 2,305,442 | 12/1942 | Percy............................. | 73/355 R X |
| 2,815,276 | 12/1957 | Michaux....................... | 73/355 R X |
| 2,395,937 | 3/1946 | Paalu........................... | 73/355 R UX |

FOREIGN PATENTS OR APPLICATIONS
| | | | |
|---|---|---|---|
| 1,004,123 | 3/1952 | France.............................. | 73/355 R |

OTHER PUBLICATIONS

Translation of French Patent 1,004,123. "Method and Apparatus for Temperature Determination of Pneumatic Converter Bath."

*Primary Examiner*—Richard C. Queisser
*Assistant Examiner*—Frederick Shoon
*Attorney*—Bacon & Thomas

[57] ABSTRACT

The temperature of molten steel in a converter is measured by blasting an inert gas through a tube into the melt so as to provide a gas/liquid interface adjacent the end of the tube and measuring the temperature of the melt by sighting radiation pyrometer along the tube through the gas towards the interface.

More particularly the gas is heated e.g. by a plasma arc, to a temperature approximating that of the melt. The tube may depend into the converter from above or it may extend through the wall of the vessel below the surface of the melt.

7 Claims, 4 Drawing Figures

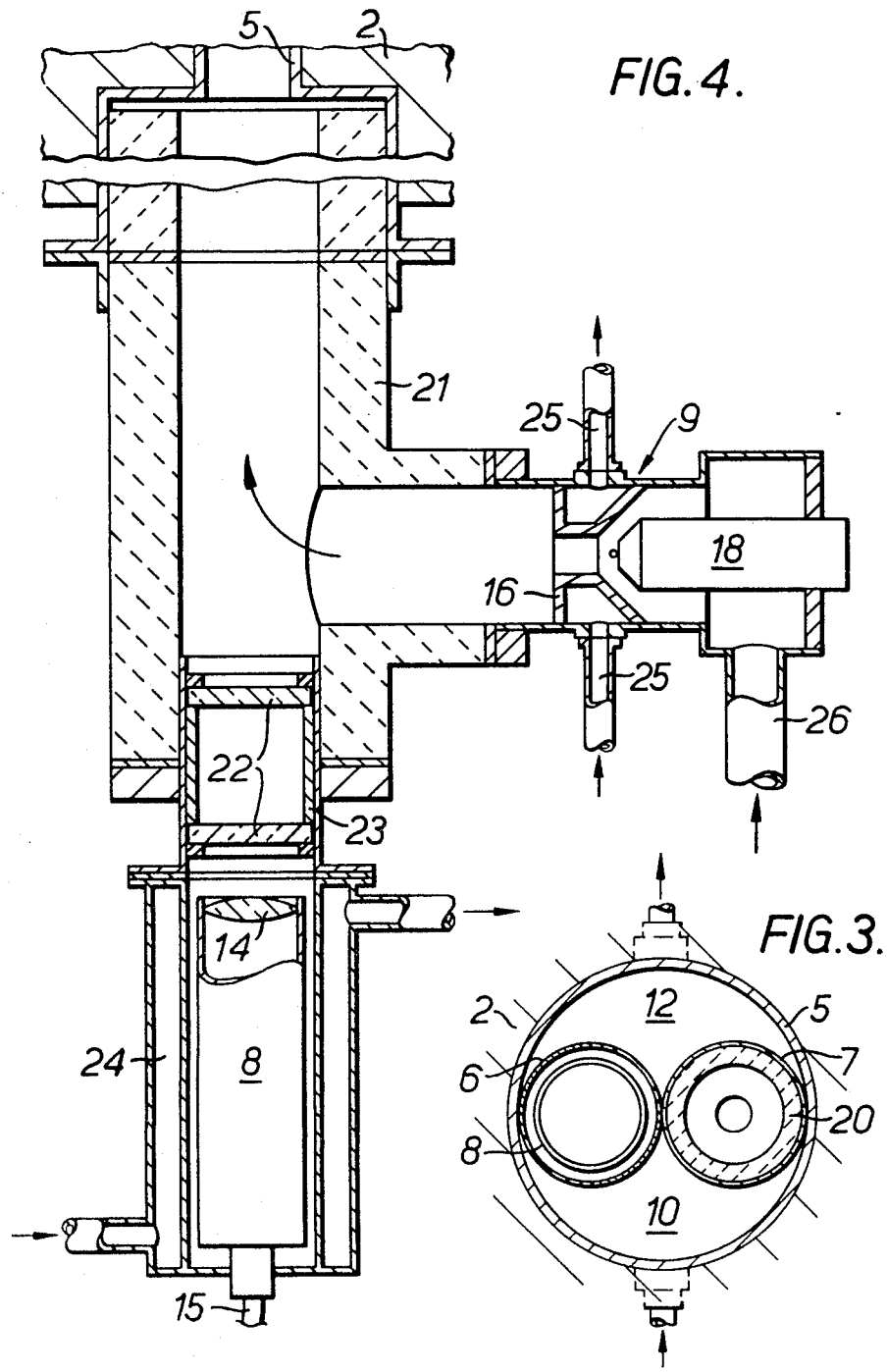

TEMPERATURE MEASUREMENT

This invention relates to temperature measurement, and more particularly relates to measurement of the temperature of a liquid, e.g. molten iron or steel.

An important parameter in the control of steelmaking processes is the temperature and there are a number of methods of measurement which can be employed involving, for example, (a) immersion thermocouples (b) wall thermocouples and (c) radiation pyrometers. The first of these methods requires the steelmaking process to be suspended whilst measurements are made and the second tends not to give the true temperature of the melt.

Radiation pyrometers, the other alternative, have hitherto suffered from difficulties in obtaining a clear "sight path" through fume and flame and in conventional use there is a possibility of them reading the temperature, not of the molten steel, but a cooler slag coating; otherwise however, they are accurate and convenient to use.

It is an object of this invention to provide an improved method of, and apparatus for, measuring the temperature of a liquid utilising this instrument.

From one aspect the invention provides a method of measuring the temperature of a liquid, in which a gas is blasted through a tube into the liquid to provide a gas/liquid interface adjacent the end of the tube and in which the liquid temperature is measured by a radiation pyrometer sighted along this tube through the gas towards the interface.

Similarly, the invention also provides apparatus for measuring the temperature of a liquid, comprising a tube for contacting the liquid at one end, means for blasting a gas through the tube into the liquid so as to provide a gas/liquid interface adjacent the said end, and a radiation pyrometer for measuring the liquid temperature sighted along the tube through the gas towards the interface.

The liquid may be molten metal and in this instance the gas is preferably inert to the melt so as to avoid the establishment of a reaction "zone" at the end of the tube which would give rise to false temperature readings, and so as not to affect the composition of the melt. The gas may also be preheated to a temperature similar to that of the melt, and this is particularly advantageous compared with a "cold" gas purge since heat is supplied to the melt, inhibiting the tendency for the metal to solidify around the end of the tube; in addition, the resultant thermal expansion of the gas reduces the amount of this media required for the operation.

The tube may be immersed into the melt from above, e.g. through the mouth of a convertor in a steelmaking process, or it may be built into the base of the vessel so that it is covered by the contents. The pyrometer is preferably mounted in this tube and sighted through a silica window, and the pyrometer employed may be of the two-colour type since it is substantially independent of both the emissivity of the "target" and atmospheres containing a moderate amount of flame and fume, and is insensitive to partial obscuration of the target area.

In order that the invention may be fully understood two embodiments thereof will now be described, by way of example, with reference to the accompanying drawings in which:

FIG. 1 schematically illustrates a cross-sectional view through a Bessemer convertor in which the temperature-measuring apparatus is situated in the base;

FIG. 3 illustrates a cross-section through A—A in FIG. 2; and

FIG. 4 illustrates another form of this apparatus.

Figure 1:
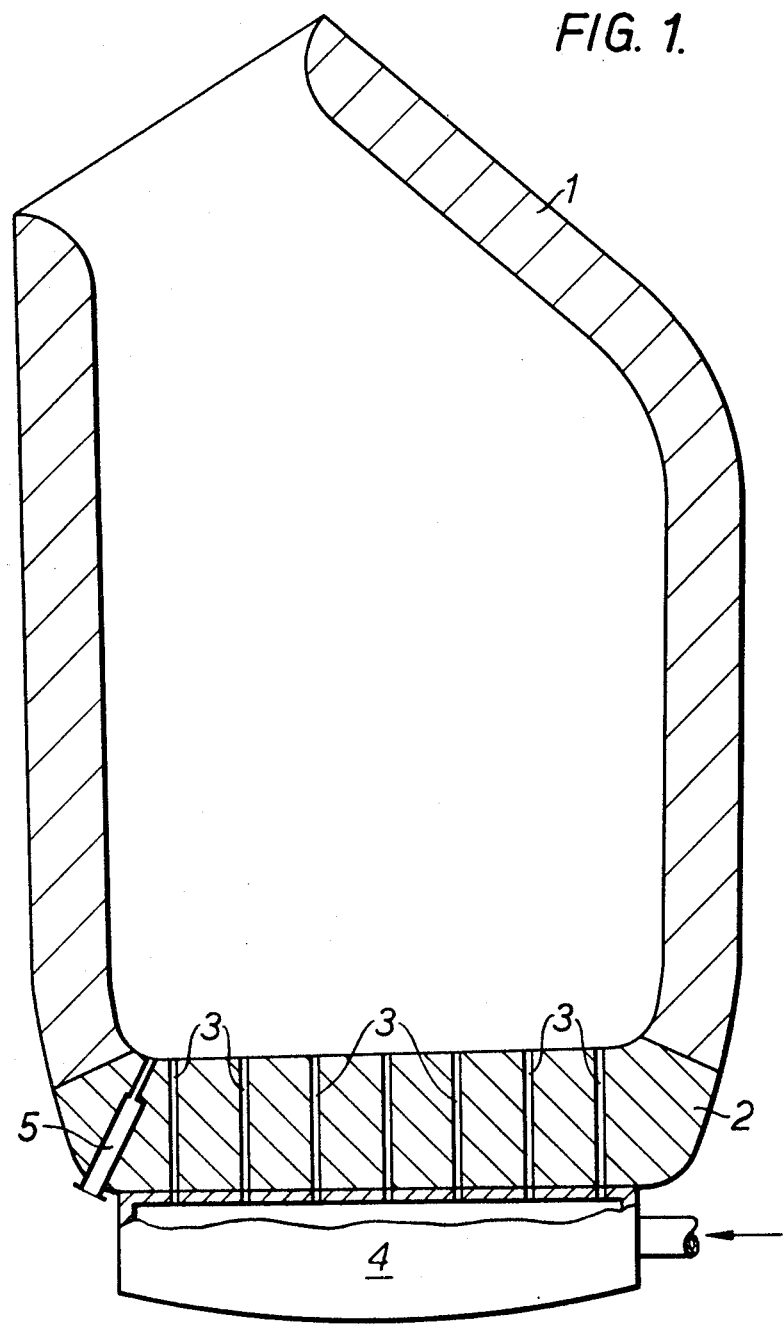

Referring now to FIG. 1, a Bessemer convertor is illustrated having a refractory-lined casing 1 and a tuyere plug 2 through which extend tuyeres 3. A wind box 4 through which air is blasted into the molten iron charge is mounted below the plug, and a sight tube 5 with which the temperature measuring apparatus is aligned extends through this plug. This tube extends as near vertically through the plug as practicable so that there is negligible difference in the ferrostatic "head" across the inner orifice of the tube. If this were not the case there may be a tendency for the iron to run into the tube and freeze along the walls.

Figure 2:
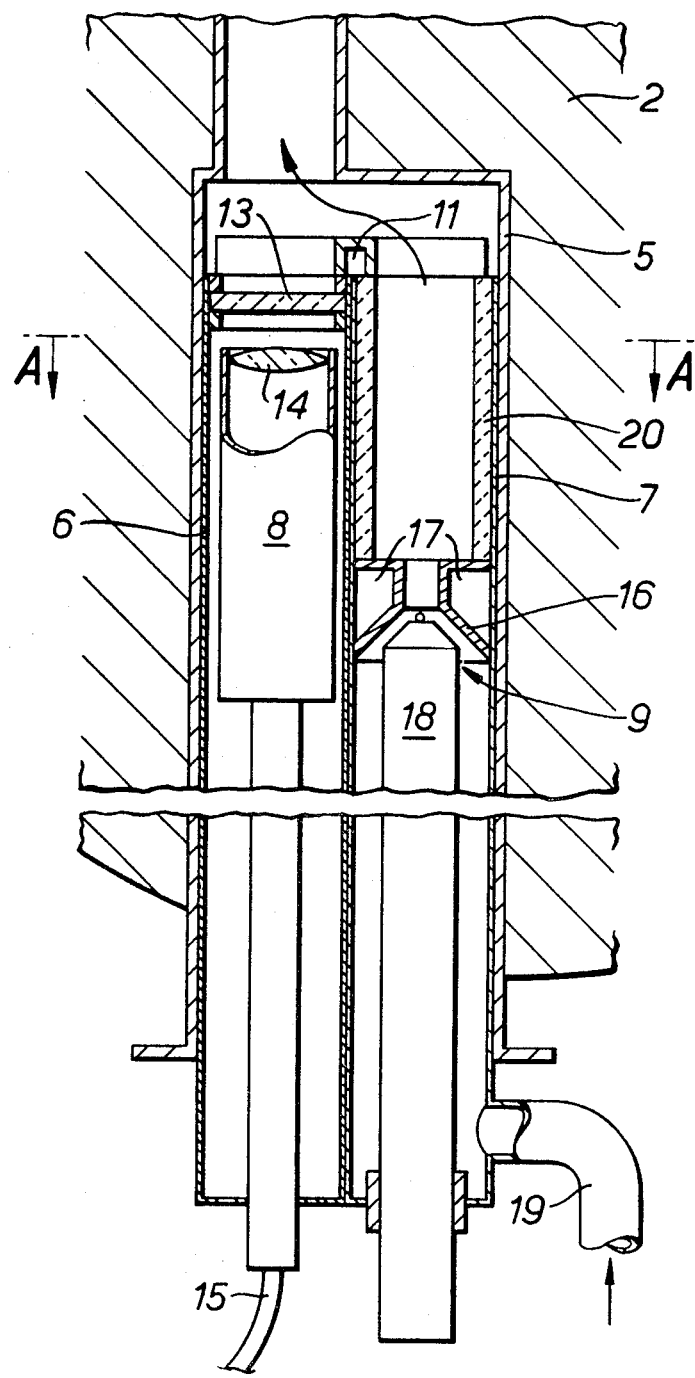
FIG. 2 illustrates one form of this apparatus.

In FIGS. 2 and 3, one form of the temperature measuring apparatus is illustrated in which it is located within the sight tube 5 itself. In this instance, two tubular members 6, 7 are provided, one housing a two-colour radiation pyrometer 8 and the other housing a plasma gun 9. Both of these items are water-cooled, the water running along a path 10 up one side of these members through a bridging duct 11 and down the other side 12.

The pyrometer, which determines temperature from the ratio of intensities emitted at two discrete wavelengths, includes a silica sealing window 13 adjacent to which is a lens 14 for focusing the incident energy on to a detector head, the output being taken through a lead 15 at the base of this instrument.

The plasma gun comprises an anode 16 — water-cooled through ducts 17 extending between the paths 10, 12 — and an elongated cathode 18.

A gas inlet circuit 19 is provided adjacent the cathode 18 and a refractory lining 20 extends around the inside of the tubular member 7 "upstream" of the anode.

In operation, gas, e.g. argon, is blasted through the conduit 19 into the plasma gun, the gun is ignited and the gas is heated to a very high temperature (e.g. 1,000° C) as it traverses the arc drawn between the anode and cathode. The incoming gas cools the cathode whilst the high temperature gas issuing from the gun is forced upwardly through the sight tube into the molten metal in the convertor.

The pressure of the gas, which may be about 30 lbs per square inch, is such as to purge the passage and provide a continuous series of bubbles at the mouth of the sight tube which successively break away from the end, the line of sight for the pyrometer thus being cleared so that the temperature of the melt at the gas/liquid interface is measured directly by the pyrometer through this gaseous medium.

As mentioned, the apparatus shown in FIGS. 2 and 3 is mounted within the sight tube, but in FIG. 4 an alternative scheme is shown in which a two-colour radiation pyrometer is utilised having a smaller "angle of acceptance" for the radiation, thus allowing it to be situated outside the vessel. This mode of construction also enables the plasma gun and the pyrometer to be separately detachable, facilitating replacement and servicing.

In particular, a refractory sleeve 21 is clamped to the sight tube 5 and the pyrometer 8 is directly aligned with this tube through a pair of silica windows 22 spaced apart by a copper sleeve 23. The pyrometer is mounted in a water-cooled jacket 24, the pyrometer/jacket assembly being readily detachable from the sleeve 21.

The plasma gun 9 is tee'd into the refractory sleeve and, as before, comprises a cathode and a water-cooled anode, separate conduits 25 now being provided for the latter. A gas inlet conduit 26 is provided on the gun adjacent the cathode and, in operation, gas is blasted through this conduit into the gun and upwardly through the sight tube into the molten metal in the convertor.

Although the invention has been described with reference to the particular embodiment illustrated it is to be understood that various modifications and alterations may readily be adopted without departing from the scope of this invention. For example, various safety schemes may be incorporated to ensure that the plasma arc is not initiated before the purge gas flows, and that the sight tube will be purged with an enhanced gas flow should the plasma gun fail to ignite so as to keep the tube clear and prevent the metal freezing and scabbing around it. An auxiliary supply of gas may also be coupled in circuit for emergency purposes.

Provision may also be made to automate the temperature measurement enabling the gas purge to start whenever the blast is switched on to the vessel, and the plasma gun to be ignited. Subsequently, after the blast has been removed and the convertor tilted and discharged, the purge gas is maintained for a short while so that any liquid slag remaining after the heat drains away from the sight hole into the vessel.

Further, although the invention has been described in connection with steelmaking in a Bessemer convertor, it is to be understood that it is equally applicable to other vessels, for example, an LD convertor, and, as mentioned above, the apparatus need not be sited in the base of the vessel — it could readily be lowered through the mouth in a lance. In addition, although reference has been made to the use of argon gas other gases may alternatively be employed, for example, blast furnace gas, which is in plentiful supply, or nitrogen if this is acceptable.

We claim:

1. Apparatus for measuring the temperature of a molten metal in a vessel, comprising
    a tube having one end which contacts the melt,
    an inert gas source,
    heater means for preheating the gas to a temperature approximating that of the melt,
    pressure means for blasting the gas through the tube into the melt so as to create a gas/liquid interface adjacent the said one end of the tube, and
    a radiation pyrometer for measuring the temperature of the melt sighted along the tube through the gas towards the interface.

2. Apparatus according to claim 1, wherein the heater means comprises a plasma arc gun.

3. Apparatus according to claim 2, wherein the tube includes two channels, one of said channels containing the pyrometer and lying in alignment with the gas/liquid interface and the other channel communicating with the said one channel and containing the plasma arc gun.

4. Apparatus according to claim 1, wherein the radiation pyrometer is of the two-colour type.

5. Apparatus according to claim 4, wherein the tube projects through the vessel at a level below the surface of the melt.

6. Apparatus according to claim 4, wherein the tube is immersed into the surface of the melt.

7. A method of measuring the temperature of a molten charge in a vessel comprising:
    preheating a gas inert to the melt to a temperature approximating that of the melt, blasting said gas through a tube into the melt to provide a gas/liquid interface adjacent the end of the tube, and
    measuring the temperature of the melt by a radiation pyrometer sighted along the tube through the gas towards the interface.

* * * * *